United States Patent
Chen (10) Patent No.: US 12,363,047 B2
(45) Date of Patent: Jul. 15, 2025

(54) TIMER PROCESSING METHOD, APPARATUS AND STORAGE MEDIUM

(71) Applicant: DATANG MOBILE COMMUNICATIONS EQUIPMENT CO., LTD., Beijing (CN)

(72) Inventor: Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/686,860

(22) PCT Filed: Aug. 19, 2022

(86) PCT No.: PCT/CN2022/113771
§ 371 (c)(1),
(2) Date: Feb. 26, 2024

(87) PCT Pub. No.: WO2023/040586
PCT Pub. Date: Mar. 23, 2023

(65) Prior Publication Data
US 2025/0133030 A1    Apr. 24, 2025

(30) Foreign Application Priority Data

Sep. 16, 2021    (CN) .......................... 202111089526.8

(51) Int. Cl.
*H04L 47/32*  (2022.01)
*H04L 47/12*  (2022.01)
*H04L 69/28*  (2022.01)

(52) U.S. Cl.
CPC .............. *H04L 47/32* (2013.01); *H04L 47/12* (2013.01); *H04L 69/28* (2013.01)

(58) Field of Classification Search
None
See application file for complete search history.

(56) References Cited

U.S. PATENT DOCUMENTS 10,531,320 B2 *  1/2020  Yi ........................ H04L 43/0858
10,917,817 B2 *  2/2021  Eriksson ............... H04L 47/564
(Continued)

FOREIGN PATENT DOCUMENTS

CN    101677266 A    3/2010
CN    101809970 A    8/2010
(Continued)

OTHER PUBLICATIONS

European Patent Office, Extended European Search Report Issued in Application No. 22868960.0, Dec. 12, 2024, Germany, 10 pages.
(Continued)

*Primary Examiner* — Melvin H Pollack
(74) *Attorney, Agent, or Firm* — KILPATRICK TOWNSEND & STOCKTON LLP (57) ABSTRACT

The present disclosure provides a timer processing method, an apparatus and a storage medium. On a terminal side, the method includes: determining a PDCP SDU group, where the terminal maintains different PDCP discard timer lengths for multiple PDCP SDUs in the PDCP SDU group. Therefore, it is beneficial for realizing the effective transmission of multiple PDCP SDUs in the PDCP SDU group, and realizing the effective transmission of multiple IP packets in a data frame, thereby improving the air interface resource efficiency while ensuring the packet delay requirement.

20 Claims, 4 Drawing Sheets

(56) References Cited

U.S. PATENT DOCUMENTS

| | | | |
|---|---|---|---|
| 11,722,425 B2* | 8/2023 | Fu | H04L 47/2483 370/236 |
| 11,785,501 B2* | 10/2023 | Rao | H04W 28/0278 370/230 |
| 11,924,747 B2* | 3/2024 | Kim | H04W 48/16 |
| 11,997,672 B2* | 5/2024 | Fujishiro | H04W 28/12 |
| 12,041,487 B2* | 7/2024 | Zhang | H04W 76/15 |
| 12,052,152 B2* | 7/2024 | Zhang | H04L 1/1841 |
| 12,088,513 B2* | 9/2024 | Lee | H04L 5/0055 |
| 2010/0034187 A1 | 2/2010 | Kumar et al. | |
| 2020/0100324 A1* | 3/2020 | Wittberg | H04W 24/02 |
| 2020/0413479 A1 | 12/2020 | Yi et al. | |
| 2021/0029777 A1 | 1/2021 | Lv et al. | |
| 2022/0141146 A1 | 5/2022 | Fu | |
| 2023/0292128 A1* | 9/2023 | Kim | H04W 76/19 |
| 2023/0362960 A1* | 11/2023 | Adjakple | H04W 4/08 |
| 2024/0015550 A1* | 1/2024 | Parichehrehteroujeni | H04W 24/08 |
| 2024/0334529 A1* | 10/2024 | Lee | H04W 28/06 |

FOREIGN PATENT DOCUMENTS

| | | | | |
|---|---|---|---|---|
| CN | 102076040 | A | | 5/2011 |
| CN | 108200605 | A | | 6/2018 |
| CN | 108419275 | A | | 8/2018 |
| CN | 108541387 | A | | 9/2018 |
| CN | 119697695 | A | * | 3/2025 |
| EP | 3609229 | A1 | | 2/2020 |
| KR | 20170017281 | A | * | 2/2017 |
| WO | 2009045945 | A2 | | 4/2009 |
| WO | WO-2017061695 | A1 | * | 4/2017 ............ H04L 47/32 |
| WO | 2018195770 | A1 | | 11/2018 |
| WO | WO-2019029350 | A1 | * | 2/2019 ........... H04W 28/02 |
| WO | 2020167857 | A1 | | 8/2020 |
| WO | 2021031019 | A1 | | 2/2021 |
| WO | WO-2024205374 | A2 | * | 10/2024 |
| WO | WO-2025068495 | A1 | * | 4/2025 |

OTHER PUBLICATIONS

Intel Corporation: "Video signalling related enhancements", 3GPP TSG-RAN WG2 Meeting #95, Gothenburg, Sweden, Aug. 22-26, 2016, total 5 pages, R2-164992.

State Intellectual Property Office of the People's Republic of China, Notice of Allowance Issued in Application No. 202111089526.8, Oct. 22, 2024, 6 pages.

ISA State Intellectual Property Office of the People's Republic of China, International Search Report and written opinion Issued in Application No. PCT/CN2022/113771, Nov. 17, 2022, WIPO, 14 pages.

CATT, "Discussion on the measurements of packet delay and loss", 3GPP TSG RAN WG2 Meeting #90, , Fukuoka, Japan, May 25-29, 2015, total 3 pages, R2-152268.

State Intellectual Property Office of the People's Republic of China, Office Action and Search Report Issued in Application No. 202111089526.8, Jun. 1, 2024, 20 pages.

Mitsubishi Electric Corp., "A New Measurement to Support UL Scheduler Operation", 3GPP TSG RAN2#57, St. Louis, USA, Feb. 12-16, 2007, total 4 pages, R2-070492.

* cited by examiner

TIMER PROCESSING METHOD, APPARATUS AND STORAGE MEDIUM

CROSS-REFERENCE TO RELATED APPLICATION

The present disclosure is a National Stage of International Application No. PCT/CN2022/113771, filed on Aug. 19, 2022, which claims priority to Chinese Patent Application No. 202111089526.8, filed to China National Intellectual Property Administration on Sep. 16, 2021 and entitled "Timer Processing Method, Apparatus and Storage Medium". The above applications are hereby incorporated by reference in their entireties.

TECHNICAL FIELD

The present disclosure relates to the field of communications and, in particular, to a timer processing method, an apparatus and a storage medium.

BACKGROUND

In communication systems, some services have the requirements of low delay, high throughput and high reliability, such as eXtened reality (XR) and cloud game (Cloud CG), which are one of the most important 5G media applications. This kind of services require large data transmission within short time, and the burst throughput thereof maybe much higher than the average throughput within the short time; meanwhile high reliability also needs to be ensured. In this kind of services, there is a service modeled with frame-level packets (for example, XR service), and its service characteristic requirements are for data frames, such as requiring data frames to meet low delay.

In the communication systems, a user plane air interface protocol stack includes a service data adaptation protocol (SDAP) layer, a packet data convergence protocol (PDCP) layer, a radio link control (RLC) layer, a media access control (MAC) layer and a physical layer (PHY). In the service modeled with frame-level data packets, one data packet corresponds to one data frame, and each of multiple IP packets divided from one data frame is transmitted independently over the air interface, that is, one IP packet corresponds to one PDCP service data unit (SDU) after being mapped to the air interface.

At present, in order to avoid congestion and to timely transmit PCDP SDUs, a network device configures a PDCP discard timer for an uplink PDCP entity. When each PDCP SDU reaches the PDCP layer, the PDCP discard timer is started for this PDCP SDU, and if this PDCP SDU is not delivered to the next protocol layer (i.e., the RLC layer) when the PDCP discard timer times out, this PDCP SDU is discarded.

SUMMARY

The present disclosure provides a timer processing method, an apparatus and a storage medium, for solving the problem of low efficiency of air interface resources resulted from that remaining PDCP SDUs are still being transmitted in a case that PDCP discard timers of some PDCP SDUs have timed out in a transmission process of multiple IP packets of a data frame.

In a first aspect, the present disclosure provides a timer processing method, where the method is applied to a terminal, and includes:

determining a packet data convergence protocol (PDCP) service data unit (SDU) group, where the terminal maintains different PDCP discard timer lengths for multiple PDCP SDUs in the PDCP SDU group.

In some implementations, multiple PDCP SDUs in the PDCP SDU group are used for transmitting multiple IP packets of a same data frame.

In some implementations, PDCP discard timers of different PDCP SDUs in the PDCP SDU group have a same timeout time point, or timeout time intervals of PDCP discard timers of different PDCP SDUs are less than or equal to a PDCP discard timer error threshold.

In some implementations, determining the PDCP SDU group includes at least one of the following:
  in a case that a service to which the data frame belongs is a periodic service and there is only one data frame in one service cycle, determining the PDCP SDU group to include all PDCP SDUs within a same service cycle;
  in a case that IP packets carry data frame labels, determining the PDCP SDU group to include multiple PDCP SDUs for transmitting IP packets carrying same data frame labels;
  determining the PDCP SDU group to include PDCP SDUs for transmitting multiple IP packets of a same data frame, by performing deep packet parsing on the IP packets transmitted by the PDCP SDUs;
  in a case that PDCP SDUs carry group identifiers, determining the PDCP SDU group to include multiple PDCP SDUs with same group identifiers, where the group identifiers in the PDCP SDUs come from service data adaptation protocol (SDAP) protocol data units (PDUs).

In some implementations, at least two PDCP SDUs in the PDCP SDU group arrive at a PDCP layer at different time points, and the terminal maintains different PDCP discard timer lengths for multiple PDCP SDUs in the PDCP SDU group, including any one of the following:
  one PDCP discard timer corresponding to a PDCP entity is pre-configured for the terminal by a network device; in the PDCP SDU group, time starting points of PDCP discard timers of all PDCP SDUs are a time point when a first PDCP SDU arrives at the PDCP layer, and timeout time points of the PDCP discard timers of all PDCP SDUs are a timeout time point of a PDCP discard timer of the first PDCP SDU; or
  one PDCP discard timer corresponding to a PDCP entity is pre-configured for the terminal by a network device; in the PDCP SDU group, according to a difference between a time point when each PDCP SDU arrives at the PDCP layer and a time point when a first PDCP SDU arrives at the PDCP layer, a length of the PDCP discard timer configured by the network device is adjusted to obtain a length of a PDCP discard timer of the each PDCP SDU, where a time starting point of the PDCP discard timer of each PDCP SDU is the time point when the each PDCP SDU arrives at the PDCP layer; or
  multiple PDCP discard timers with different lengths corresponding to a PDCP entity are pre-configured for the terminal by a network device; in the PDCP SDU group, multiple PDCP discard timers is used in turn according to a sequence in which the PDCP SDUs arrive at the PDCP layer.

In a second aspect, the present disclosure provides a timer processing method, where the method is applied to a network device, and includes:

configuring one or more PDCP discard timers corresponding to a PDCP entity for a terminal, and/or configuring a PDCP discard timer error threshold corresponding to the PDCP entity for the terminal, where the PDCP discard timer error threshold is used for constraining timeout time intervals of PDCP discard timers of different PDCP SDUs in a PDCP SDU group of the PDCP entity.

In a third aspect, the present disclosure provides a timer processing apparatus, applied to a terminal, where the timer processing apparatus includes a memory, a transceiver and a processor;

the memory is adapted to store a computer program;
the transceiver is adapted to receive and transmit data under control of the processor;
the processor is adapted to read the computer program in the memory and perform the following operation:
determining a packet data convergence protocol (PDCP) service data unit (SDU) group, where the terminal maintains different PDCP discard timer lengths for multiple PDCP SDUs in the PDCP SDU group.

In some implementations, multiple PDCP SDUs in the PDCP SDU group are used for transmitting multiple IP packets of a same data frame.

In some implementations, PDCP discard timers of different PDCP SDUs in the PDCP SDU group have a same timeout time point, or timeout time intervals of PDCP discard timers of different PDCP SDUs are less than or equal to a PDCP discard timer error threshold.

In some implementations, the processor is further adapted to perform at least one of the following operations:
in a case that a service to which the data frame belongs is a periodic service and there is only one data frame in one service cycle, determining the PDCP SDU group to include all PDCP SDUs within a same service cycle;
in a case that IP packets carry data frame labels, determining the PDCP SDU group to include multiple PDCP SDUs for transmitting IP packets carrying same data frame labels;
determining the PDCP SDU group to include PDCP SDUs for transmitting multiple IP packets of a same data frame, by performing deep packet parsing on the IP packets transmitted by the PDCP SDUs;
in a case that PDCP SDUs carry group identifiers, determining the PDCP SDU group to include multiple PDCP SDUs with same group identifiers, where the group identifiers in the PDCP SDUs come from service data adaptation protocol (SDAP) protocol data units (PDUs).

In some implementations, at least two PDCP SDUs in the PDCP SDU group arrive at a PDCP layer at different time points, and the terminal maintains different PDCP discard timer lengths for multiple PDCP SDUs in the PDCP SDU group, including any one of the following:
one PDCP discard timer corresponding to a PDCP entity is pre-configured for the terminal by a network device; in the PDCP SDU group, time starting points of PDCP discard timers of all PDCP SDUs are a time point when a first PDCP SDU arrives at the PDCP layer, and timeout time points of the PDCP discard timers of all PDCP SDUs are a timeout time point of a PDCP discard timer of the first PDCP SDU; or
one PDCP discard timer corresponding to a PDCP entity is pre-configured for the terminal by a network device; in the PDCP SDU group, according to a difference between a time point when each PDCP SDU arrives at the PDCP layer and a time point when a first PDCP SDU arrives at the PDCP layer, a length of the PDCP discard timer configured by the network device is adjusted to obtain a length of a PDCP discard timer of the each PDCP SDU, where a time starting point of the PDCP discard timer of each PDCP SDU is the time point when the each PDCP SDU arrives at the PDCP layer; or
multiple PDCP discard timers with different lengths corresponding to a PDCP entity are pre-configured for the terminal by a network device; in the PDCP SDU group, multiple PDCP discard timers is used in turn according to a sequence in which the PDCP SDUs arrive at the PDCP layer.

In a fourth aspect, the present disclosure provides a timer processing apparatus, applied to a network device, where the timer processing apparatus includes a memory, a transceiver and a processor;

the memory is adapted to store a computer program;
the transceiver is adapted to receive and transmit data under control of the processor;
the processor is adapted to read the computer program in the memory and perform the following operations:
configuring one or more PDCP discard timers corresponding to a PDCP entity for a terminal, and/or configuring a PDCP discard timer error threshold corresponding to the PDCP entity for the terminal, where the PDCP discard timer error threshold is used for constraining timeout time intervals of PDCP discard timers of different PDCP SDUs in a PDCP SDU group of the PDCP entity.

In a fifth aspect, the present disclosure provides a timer processing apparatus, applied to a terminal, where the timer processing apparatus includes:
a processing unit, adapted to determine a packet data convergence protocol (PDCP) service data unit (SDU) group, where the terminal maintains different PDCP discard timer lengths for multiple PDCP SDUs in the PDCP SDU group.

In some implementations, multiple PDCP SDUs in the PDCP SDU group are used for transmitting multiple IP packets of a same data frame.

In some implementations, PDCP discard timers of different PDCP SDUs in the PDCP SDU group have a same timeout time point, or timeout time intervals of PDCP discard timers of different PDCP SDUs are less than or equal to a PDCP discard timer error threshold.

In some implementations, the processing unit is further adapted to perform at least one of the following operations:
in a case that a service to which the data frame belongs is a periodic service and there is only one data frame in one service cycle, determining the PDCP SDU group to include all PDCP SDUs within a same service cycle;
in a case that IP packets carry data frame labels, determining the PDCP SDU group to include multiple PDCP SDUs for transmitting IP packets carrying same data frame labels;
determining the PDCP SDU group to include PDCP SDUs for transmitting multiple IP packets of a same data frame, by performing deep packet parsing on the IP packets transmitted by the PDCP SDUs;
in a case that PDCP SDUs carry group identifiers, determining the PDCP SDU group to include multiple PDCP SDUs with same group identifiers, where the group identifiers in the PDCP SDUs come from service data adaptation protocol (SDAP) protocol data units (PDUs).

In some implementations, at least two PDCP SDUs in the PDCP SDU group arrive at a PDCP layer at different time points, and the terminal maintains different PDCP discard timer lengths for multiple PDCP SDUs in the PDCP SDU group, including any one of the following:

one PDCP discard timer corresponding to a PDCP entity is pre-configured for the terminal by a network device; in the PDCP SDU group, time starting points of PDCP discard timers of all PDCP SDUs are a time point when a first PDCP SDU arrives at the PDCP layer, and timeout time points of the PDCP discard timers of all PDCP SDUs are a timeout time point of a PDCP discard timer of the first PDCP SDU; or one PDCP discard timer corresponding to a PDCP entity is pre-configured for the terminal by a network device; in the PDCP SDU group, according to a difference between a time point when each PDCP SDU arrives at the PDCP layer and a time point when a first PDCP SDU arrives at the PDCP layer, a length of the PDCP discard timer configured by the network device is adjusted to obtain a length of a PDCP discard timer of the each PDCP SDU, where a time starting point of the PDCP discard timer of each PDCP SDU is the time point when the each PDCP SDU arrives at the PDCP layer; or multiple PDCP discard timers with different lengths corresponding to a PDCP entity are pre-configured for the terminal by a network device; in the PDCP SDU group, multiple PDCP discard timers is used in turn according to a sequence in which the PDCP SDUs arrive at the PDCP layer.

In a sixth aspect, the present disclosure provides a timer processing apparatus, applied to a network device, where the timer processing apparatus includes:

a configuring unit, adapted to configure one or more PDCP discard timers corresponding to a PDCP entity for a terminal, and/or configure a PDCP discard timer error threshold corresponding to the PDCP entity for the terminal, where the PDCP discard timer error threshold is used for constraining timeout time intervals of PDCP discard timers of different PDCP SDUs in a PDCP SDU group of the PDCP entity.

In a seventh aspect, the present disclosure provides a processor-readable storage medium, and the processor-readable storage medium stores a computer program for causing a processor to execute the timer processing method described in the first aspect or the second aspect.

In an eighth aspect, the present disclosure provides a computer program product containing instructions, and when the instructions are run on a computer, the computer is caused to execute the timer processing method as described in the above first aspect or second aspect.

In a ninth aspect, the present disclosure provides a communication system, including the network device as described in any of the above and at least one terminal as described in any of the above.

The present disclosure provides a timer processing method, an apparatus and a storage medium. In the method, a terminal determines a PDCP SDU group at a PDCP layer, where the terminal maintains different PDCP discard timer lengths for multiple PDCP SDUs in the PDCP SDU group. Compared with a manner of maintaining one PDCP discard timer length in a PDCP entity, this method fully considers that different PDCP SDUs may arrive at the PDCP layer at different times in a transmission process of multiple IP packets of a data frame, and by maintaining different PDCP discard timer lengths for multiple PDCP SDUs in the PDCP SDU group, it is beneficial for the terminal to adopt an appropriate PDCP discard timer length for a PDCP SDU according to the time when the PDCP SDU arrives at the PDCP layer, so as to solve the problem that the PDCP discard timer of the PDCP SDU where one IP packet in the data frame is located has timed out while other IP packets in the data frame are still being transmitted.

Therefore, it is beneficial for realizing the effective transmission of multiple PDCP SDUs in the PDCP SDU group, and realizing the effective transmission of multiple IP packets in the data frame, thereby improving the air interface resource efficiency while ensuring the packet delay requirement.

It should be understood that the content described in the above Summary section is not intended to define key or important features of the embodiments of the present disclosure, nor is it intended to limit the scope of the present disclosure. Other features of the present disclosure will be easily understood from the following description.

BRIEF DESCRIPTION OF DRAWINGS

In order to illustrate technical solutions of the present disclosure or in the prior art more clearly, the drawings needed to be used in the description of embodiments or the prior art will be briefly introduced below. Obviously, the drawings in the following description are some embodiments of the present disclosure, and other drawings can be obtained for those of ordinary skills in the art according to these drawings without paying creative effort.

DESCRIPTION OF EMBODIMENTS

In the present disclosure, "at least one" refers to one or more, and "multiple" refers to two or more. "And/or" describes an association relationship of associated objects, which means that there can be three relationships. For example, "A and/or B" can mean that A exists alone, A and B exist at the same time, B exists alone, where A and B may be singular or plural. The character "/" generally indicates that associated object before and after the character is of an "or" relationship. "At least one of the following items" or its similar expression refers to any combination of these items, including any combination of single item(s) or plural items. For example, at least one of a, b or c can mean: a, b, c, a-b, a-c, b-c, or a-b-c, where a, b and c may be single and may also be multiple.

It can be understood that steps or operations in embodiments of the present disclosure are only examples, and the embodiments of the present disclosure can also perform other operations or variations of the operations. Furthermore, the steps may be performed in a different order from that presented in the embodiments of the present disclosure, and it may not be necessary to perform all the operations in the embodiments of the present disclosure.

In the following, the technical solutions in the embodiments of the present disclosure will be clearly and completely described with reference to the drawings. Obviously, the described embodiments are only a part of the embodiments of the present disclosure, not all the embodiments. Based on the embodiments in the present disclosure, all other embodiments obtained by those of ordinary skills in the art without paying creative effort belong to the scope of protection of the present disclosure.

The technical solutions provided by the embodiments of the present disclosure may be applied to multiple systems, especially a 5G system. For example, applicable systems may be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, an universal mobile telecommunication system (UMTS), a worldwide interoperability for microwave access (WiMAX) system, a 5G new radio (NR) system, etc. These systems all include terminals and network devices. The systems can also include a core network portion, such as an evolved packet system (EPS), a 5G system (5GS), etc.

A terminal involved in the embodiments of the present disclosure may refer to a device that provides voice and/or data connectivity to users, a handheld device with a wireless connection function, or other processing devices connected to a wireless modulator, etc. In different systems, the name of the terminal may be different. For example, in the 5G system, the terminal may be called a user equipment (UE). A wireless terminal can communicate with one or more core networks (CNs) via a radio access network (RAN). The wireless terminal may be a mobile terminal, such as a mobile phone (or "cellular" phone) and a computer with the mobile terminal, such as portable, pocket-sized, handheld, computer-built or vehicle-mounted mobile apparatuses, which exchange voice and/or data with the radio access network. For example, the wireless terminal may be a personal communication service (PCS) phone, a cordless phone, a session initiated protocol (SIP) phone, a wireless local loop (WLL) station, a personal digital assistant (PDA) or other devices. The wireless terminal may also be called a system, a subscriber unit, a subscriber station, a mobile station, a mobile, a remote station, an access point, a remote terminal, an access terminal, a user terminal, a user agent, a user device, which are not limited in the embodiments of the present disclosure.

A network device involved in the embodiments of the present disclosure may be a base station, which may include multiple cells providing services for a terminal. According to different specific application scenarios, a base station may also be called an access point, or may be a device in an access network that communicates with a wireless terminal through one or more sectors over an air interface, or may be called other names. The network device can be used for exchanging received air frames with Internet protocol (IP) packets, and act as a router between the wireless terminal and the rest of the access network, where the rest of the access network may include an Internet protocol (IP) communication network. The network device can also coordinate the attribute management for the air interface. For example, the network device involved in the embodiments of the present disclosure may be a network device (BTS) in global system for mobile communications (GSM) or code division multiple access (CDMA), or a network device (NodeB) in wideband code division multiple access (WCDMA), or an evolutional network device (evolutional Node B, eNB or e-NodeB) in a long term evolution (LTE) system, a 5G base station (gNB) in a 5G network architecture (next generation system), or a home evolved base station (HeNB), a relay node (relay node), a home base station (femto), a pico, etc., which are not limited in the embodiments of the present disclosure. In some network structures, network devices may include a centralized unit (CU) node and a distributed unit (DU) node, and the centralized unit and the distributed unit may also be geographically separated.

One or more antennas can be used by the network device and the terminal, respectively, for multi input multi output (MIMO) transmission therebetween, and the MIMO transmission may be single user MIMO (SU-MIMO) or multiple user MIMO (Multiple User MIMO, MU-MIMO). According to the shape and number of root antenna combinations, the MIMO transmission may be 2D-MIMO, 3D-MIMO, FD-MIMO or massive-MIMO, and may also be diversity transmission or precoding transmission or beamforming transmission, etc.

First, the discovery of the technical problems to be solved by the embodiments of the present disclosure is described Taking an XR service as an example, the XR service is modeled with frame-level data packets (that is, modeling based on data frames) in a 5G system. Each packet (Packet, also called packet) corresponds to one data frame (also called an XR video frame in the XR service), and each data frame can be divided into multiple IP packets. XR is the general name of different types of reality, and refers to all environments and human-computer interactions which combine reality and virtuality and are generated by computer technologies and devices, including representative forms such as augmented reality (AR), mixed reality (MR) and virtual reality (VR).

Figure 1A:
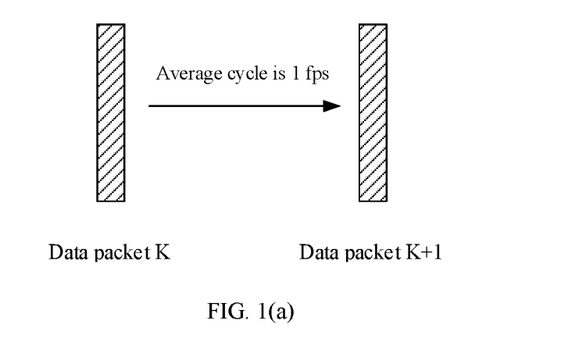
FIG. 1(a) is an example diagram of modeling with frame-level data packets of an XR service.
Figure 1B:
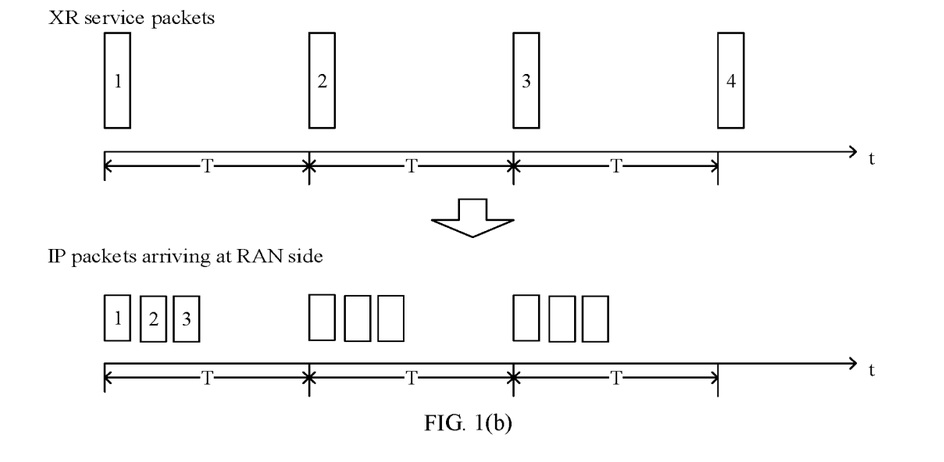
FIG. 1(b) is an example diagram of one XR service data packet being mapped to multiple IP packets at an air interface of a 5G system.

Referring to FIG. 1(a) and FIG. 1(b), FIG. 1(a) is an example diagram of modeling with frame-level data packets of an XR service, and FIG. 1(b) is an example diagram of an XR service data packet being mapped to multiple IP packets at an air interface of a 5G system. As shown in FIG. 1(a), the XR service includes data packets that follow a certain probability distribution. Taking data packet K and data packet K+1 as examples, data packet K represents data frame K containing multiple IP packets, and data packet K+1 represents data frame K+1 containing multiple IP packets, where the average cycle of data frames is 1 frame per second (frame per second, fps). As shown in FIG. 1(b), four XR service data packets are mapped to multiple IP packets respectively on a radio access network (RAN) side. For example, the first XR data packet is mapped to the first three IP packets on the RAN side, where t represents time and T represents a duration.

In the XR service, service characteristic requirements are for data frames. For example, the service characteristic requirements for data frames are a cycle of 60 fps, a data transmission rate of 10 million bits per second (Million bits per second, Mbps), a packet delay budget of 30 milliseconds (ms). Therefore, the transmission rate, reliability, delay and so on of data frames are very critical for this kind of services.

Figure 1C:
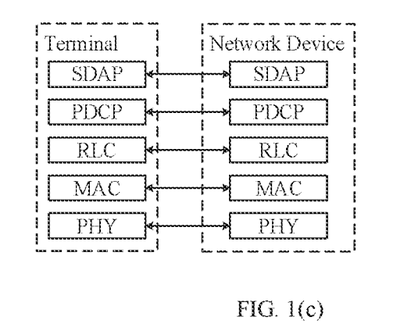
FIG. 1(c) is an example diagram of a user plane protocol stack.

In the XR service, air interface transmission takes IP packets as basic units, that is, each IP packet of a data frame is transmitted independently over the air interface. Specifically, one IP packet is mapped to the air interface, and corresponds to one PDCP service data unit (SDU) at a PDCP layer. For easy to understand, FIG. 1(c) shows an example diagram of a user plane protocol stack. As shown in FIG. 1(c), on a terminal side and a network side, the user plane air interface protocol stack includes multiple user plane air interface protocol layers: a service data adaptation protocol (SDAP) layer, a packet data convergence protocol (PDCP) layer, a radio link control (RLC) layer, a media access control (MAC) layer and a physical layer (PHY). An IP packet forms an SDAP protocol data unit (PDU) after arriving at the SDAP layer, and the SDAP PDU delivered to the PDCP layer is a PDCP SDU.

At present, a network device configures one PDCP discard timer for a PDCP entity based on a packet delay budget (PDB) of a data radio bear (DRB) corresponding to the PDCP entity. When each PDCP SDU arrives at the PDCP layer, the PDCP discard timer is started for this PDCP SDU, and if this PDCP SDU is not delivered to the next protocol layer when the PDCP discard timer times out, this PDCP SDU is discarded.

However, multiple IP packets obtained by dividing one data frame of the XR service may arrive at the PDCP layer at different times, and there is also processing delay inside a device, so that there may be a certain difference in times when these IP packets arrive at the PDCP layer. Therefore, in the above manner, the PDCP discard timer of the PDCP SDU corresponding to one IP packet may have timed out while PDCP SDUs corresponding to other IP packets are still being transmitted in a transmission process of the IP packets, which leads to the waste of air interface resources and low efficiency of air interface resources.

In order to solve the above problems, embodiments of the present disclosure provide a timer processing method, an apparatus and a storage medium. On a terminal side, the method includes: determining a PDCP SDU group, where the terminal maintains different PDCP discard timer lengths for PDCP SDUs. In this way, for the situation of IP packets in a data frame arriving at a PDCP layer at different times, the terminal can maintain different PDCP discard timer lengths for the PDCP SDUs containing the IP packets based on the different arrival times of the IP packets, which can maintain appropriate PDBs for different PDCP SDUs, so as to solve the problem that there is a certain difference in timeout time points for different IP packets in the data frame. Thus, the problem that other IP packets are still being transmitted after one or more IP packets in the data frame have timed out can be solved, thereby saving air interface resources and improving air interface resource efficiency.

The method and the apparatus are based on the same application concepts. Because the principles of solving problems by the method and the apparatus are similar, the implementation of the apparatus and the method can be referred to for each other, and the repetition will not be repeated.

It should be noted that data frames in the embodiments of the present disclosure are not limited to data frames in the XR service, but may also be data frames in other services modeled with frame-level data packets.

Figure 2:
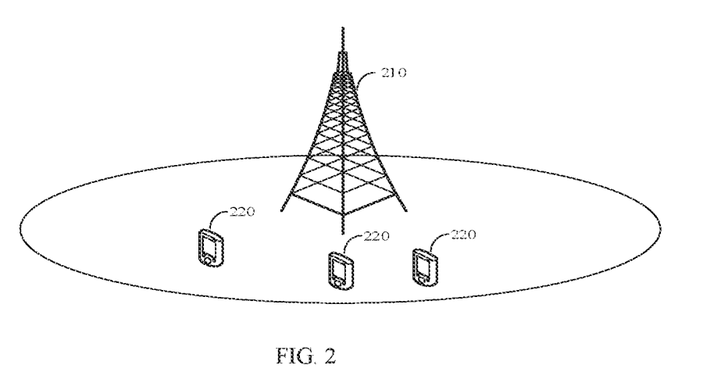
FIG. 2 is a schematic diagram of an application scenario provided by an embodiment of the present disclosure.

Referring to FIG. 2, FIG. 2 is a schematic diagram of an application scenario provided by an embodiment of the present disclosure. As shown in FIG. 2, this embodiment provides a communication system, which includes a network device 210 and terminals 220. This embodiment takes three terminals 220 as an example. In the communication system, a terminal 220 sends a data frame of a service (for example, an XR service) to the network device 210. In the sending process, the terminal 220 sequentially processes multiple IP packets of the data frame at multiple user plane air interface protocol layers, and then sends the same to the network device 210, thereby realizing the transmission of the data frame between the terminal 220 and the network device 210.

Figure 3:
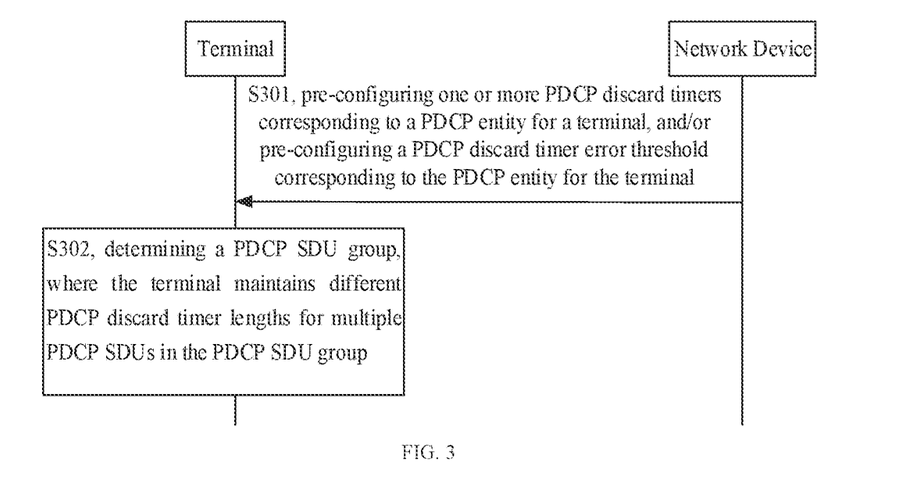
FIG. 3 is a flowchart of a timer processing method provided by an embodiment of the present disclosure.

Referring to FIG. 3, FIG. 3 is a flowchart of a timer processing method provided by an embodiment of the present disclosure. As shown in FIG. 3, the method of this embodiment may include the following steps.

S301, a network device pre-configures one or more PDCP discard timers corresponding to a PDCP entity for a terminal, and/or pre-configures a PDCP discard timer error threshold corresponding to the PDCP entity for the terminal.

In this embodiment, for each PDCP entity, the network device can configure the PDCP discard timer(s) and/or the PDCP discard timer error threshold corresponding to the PDCP entity to the terminal by sending a configuration message to the terminal in advance. The configuring manner includes at least one of the following: the network device configures one PDCP discard timer corresponding to the PDCP entity to the terminal, the network device configures multiple PDCP discard timers corresponding to the PDCP entity to the terminal, the network device configures the PDCP discard timer error threshold corresponding to the PDCP entity to the terminal. The network device configuring the PDCP discard timer error threshold corresponding to the PDCP entity to the terminal may be combined with the two configuring manners of: the network device configuring one PDCP discard timer corresponding to the PDCP entity to the terminal, the network device configuring multiple PDCP discard timers corresponding to the PDCP entity to the terminal.

The PDCP discard timer error threshold is used for constraining timeout time intervals of PDCP discard timers of multiple PDCP SDUs in the PDCP entity, especially for constraining the timeout time intervals of PDCP discard timers of different PDCP SDUs in a subsequent PDCP SDU group, so that multiple PDCP SDUs in the PDCP SDU group have similar transmission characteristics.

S302: the terminal determines a PDCP SDU group, where the terminal maintains different PDCP discard timer lengths for multiple PDCP SDUs in the PDCP SDU group.

In this embodiment, in a process of sending multiple IP packets of a data frame of a certain service, the terminal performs layer-by-layer processing on the multiple IP packets in multiple user plane air interface protocol layers of a user plane protocol stack, where the IP packets form SDAP PDUs after arriving at an SDAP layer, and the SDAP PDUs are PDCP SDUs after being delivered to a PDCP layer. At the PDCP layer, the terminal can determine a PDCP SDU group from multiple PDCP SDUs arriving at the PDCP layer, where the PDCP SDU group includes multiple PDCP SDUs. After determining the PDCP SDU group, the terminal can transmit data by using the PDCP SDU group based on maintaining different PDCP discard timer lengths for multiple PDCP SDUs in the PDCP SDU group.

In this embodiment, for the PDCP SDU group, the terminal can maintain different PDCP discard timer lengths for multiple PDCP SDUs in the PDCP SDU group on the basis of the PDCP discard timer(s) pre-configured by the network device for the PDCP entity to which the PDCP SDU group belongs. Especially in a case that arrival times of multiple PDCP SDUs in the PDCP SDU group are different, the terminal can maintain a longer PDCP discard timer length for a PDCP SDU that arrives at the PDCP layer earlier and maintain a shorter PDCP discard timer length for a PDCP SDU that arrive sat the PDCP layer later, so that timeout time points of the PDCP discard timers of multiple PDCP SDUs in the PDCP SDU group are as close as possible, that is, the IP packets transmitted by multiple PDCP SDUs in the PDCP SDU group have similar transmission characteristics.

In some implementations, in a case that the network device configures a PDCP discard timer error threshold corresponding to the PDCP entity for the terminal, the terminal can maintain that timeout time intervals of the PDCP discard timers of multiple PDCP SDUs in the PDCP SDU group are less than or equal to the PDCP discard timer error threshold.

The setting of the PDCP discard timer error threshold is to reserve an error space considering that a timing process of the PDCP discard timer has a certain fault tolerance.

In this embodiment, based on different PDCP discard timer lengths maintained for multiple PDCP SDUs in the PDCP SDU group, on the one hand, the terminal can discard invalid PDCP SDUs in time after the PDCP discard timer of one PDCP SDU times out, thereby saving air interface resources and improving air interface resource efficiency; on the other hand, the terminal can transmit the corresponding PDCP SDU in time before the PDCP discard timer of the PDCP SDU in the PDCP SDU group is about to time out, so as to guarantee the transmission delay and realize the effective transmission of multiple PDCP SDUs in the PDCP SDU group.

In the embodiment of the present disclosure, the network device pre-configures one or more PDCP discard timers and/or the PDCP discard timer error threshold corresponding to the PDCP entity for the terminal, and considering that the arrival times of the PDCP SDUs in the PDCP SDU group may be different, the terminal maintains different PDCP discard timer lengths for multiple PDCP SDUs in the PDCP SDU group in the transmission process of the data frame, so that multiple PDCP SDUs in the PDCP SDU group have similar transmission characteristics. The effective transmission of multiple PDCP SDUs in the PDCP SDU group is realized meanwhile the PDB is ensured, thereby realizing the effective transmission of multiple IP packets in the data frame, and improving the air interface resource efficiency.

In some embodiments, multiple PDCP SDUs in the PDCP SDU group are used for transmitting multiple IP packets of a same data frame. In other words, multiple PDCP SDUs in the PDCP SDU group contain multiple IP packets of the same data frame. At this time, considering that multiple IP packets of the same data frame arrive at the PDCP layer at different times, the terminal maintains different PDCP discard timer lengths for the PDCP SDUs corresponding to multiple IP packets of the same data frame, so that multiple IP packets of the same data frame have similar transmission characteristics when being transmitted at the PDCP layer, and specifically, timeout time points of the PDCP discard timers of the PDCP SDUs for transmitting the IP packets of the same data frame are close, so as to solve the problem that remaining IP packets are still being transmitted after the PDCP discard timer of the PDCP SDU where one IP packet in the same data frame is located times out.

In some embodiments, the timeout time points of the PDCP discard timers of different PDCP SDUs in the PDCP SDU group are the same, or the timeout time intervals of the PDCP discard timers of different PDCP SDUs in the PDCP SDU group are less than or equal to the PDCP discard timer error threshold. At this time, the terminal maintains different PDCP discard timer lengths for multiple PDCP SDUs in the PDCP SDU group, so that the timeout time points of the PDCP discard timers of different PDCP SDUs in the PDCP SDU group are the same, or the timeout time intervals of the PDCP discard timers of different PDCP SDUs in the PDCP SDU group are less than or equal to the PDCP discard timer error threshold. Therefore, the problem that the remaining IP packets are still being transmitted after the PDCP discard timer of the PDCP SDU where one IP packet in the same data frame is located times out is solved, which is beneficial for promoting the terminal to transmit the IP packets to a lower layer in time before similar timeout time points of the PDCP discard timers of multiple PDCP SDUs in the PDCP SDU group.

In some embodiments, based on that multiple PDCP SDUs in the PDCP SDU group are used for transmitting multiple IPs of the same data frame, possible implementations of S301 include at least one of the following.

1) In a case that a service to which the data frame belongs is a periodic service and there is only one data frame in one service cycle, IP packets arriving at the PDCP layer within one service cycle are IP packets belonging to the same data frame, so the terminal can determine the PDCP SDU group to include all PDCP SDUs within a same service cycle. Therefore, when the data frame belongs to service data of a periodic service, the PDCP SDU group can be determined based on the service cycle, improving the accuracy of determining the PDCP SDU group. The terminal can learn from an application layer whether the data frame belongs to periodic service data, and there is no limitation here.

2) In a case that IP packets carry data frame labels, the PDCP SDU group is determined to include multiple PDCP SDUs for transmitting IP packets carrying same data frame labels. Multiple IP packets of the same data frame carry the same data frame labels, and IP packets of different data frames carry different data frame labels. In other words, the data frame label corresponding to the data frame is unique. Therefore, in the case that the IP packets carry the data frame labels, the accuracy of the PDCP SDU group is improved based on the data frame labels. The terminal can add the same data frame labels to multiple IP packets of the same data frame at the application layer, and add different data frame labels to IP packets of different data frames. There is no limitation on the specific process of adding the data frame labels to the IP packets.

3) The PDCP SDU group is determined to include PDCP SDUs for transmitting multiple IP packets of the same data frame, by performing deep packet parsing on the IP packets transmitted by the PDCP SDUs. The deep packet parsing refers to obtaining frame characteristics by IP packet parsing, and multiple IP packets belonging to the same data frame can be determined by using the frame characteristics obtained by parsing, so as to determine the PDCP SDU group.

Specifically, in the PDCP layer, deep packet parsing is performed on IP packets contained in multiple PDCP SDUs to obtain inner layer information of the IP packets (the inner layer information of the IP packets can reflect the frame characteristics). Data frames to which the IP packets belong are determined according to the inner layer information of the IP packets. According to the data frames to which the IP packets belong, multiple IP packets belonging to the same data frame are determined. Then multiple PDCP SDUs for transmitting the IP packets of the same data frame are determined, and the PDCP SDU group is obtained by the multiple PDCP SDUs. Therefore, based on the manner of deep packet parsing, the accuracy of determining the PDCP SDU group is improved.

4) In a case that PDCP SDUs carry group identifiers, the PDCP SDU group is determined to include multiple PDCP SDUs with same group identifiers, where the group identifiers in the PDCP SDUs come from SDAP PDUs. Multiple PDCP SDUs that transmit IP packets of the same data frame belong to the same PDCP SDU group. The group identifier is used for identifying the PDCP SDU group and can be used for identifying the data frame accordingly, and the group identifier is an identifier introduced in this embodiment to classify multiple IP packets contained in one data frame. The IP packets contained in the PDCP SDUs carrying the same group identifiers belong to the same data frame.

Specifically, the terminal can determine multiple IP packets belonging to the same data frame at the SDAP layer according to the data frame labels of the IP packets or by performing deep packet parsing on the IP packets, and for the multiple IP packets belonging to the same data frame, carry the same group identifiers in the SDAP PDUs for transmitting these IP packets, and then send the SDAP PDUs to the PDCP layer. After the SDAP PDUs arrive at the PDCP layer, the terminal determines multiple PDCP SDUs with the same group identifiers based on the group identifiers carried in the PDCP SDUs and obtains the PDCP SDU group based on the multiple PDCP SDUs with the same group identifiers. Therefore, the accuracy of the PDCP SDU group is improved by adding the same group identifiers to the SDAP PDUs for transmitting the IP packets of the same data frame and determining the PDCP SDU group based on the group identifiers at the PDCP layer.

In some embodiments, at least two PDCP SDUs in the PDCP SDU group arrive at the PDCP layer at different time points. In this case, the terminal maintains different PDCP discard timer lengths for multiple PDCP SDUs in the PDCP SDU group, so as to solve the problem that one PDCP SDU times out among the PDCP SDUs that arrive at the PDCP layer at different times and other PDCP SDUs are still being transmitted.

The length of the PDCP discard timer is an actual timing duration of the PDCP discard timer.

The terminal maintains different PDCP discard timer lengths for multiple PDCP SDUs in the PDCP SDU group, including at least one of the following manners.

Manner 1: one PDCP discard timer corresponding to the PDCP entity is pre-configured for the terminal by the network device; in the PDCP SDU group, time starting points of the PDCP discard timers of all PDCP SDUs are a time point when a first PDCP SDU arrives at the PDCP layer, and timeout time points of the PDCP discard timers of all PDCP SDUs are a timeout time point of the PDCP discard timer of the first PDCP SDU. The first PDCP SDU refers to the PDCP SDU in the PDCP SDU group which is the first to arrive at the PDCP layer.

In this embodiment, for multiple PDCP SDUs in the PDCP SDU group, by unifying time starting points of PDCP discard timers of remaining PDCP SDUs except the first PDCP SDU as the time point when the first PDCP SDU arrives at the PDCP layer, the time starting points of the PDCP discard timers of the respective PDCP SDUs in the PDCP SDU group are consistent, and combining with the one PDCP discard timer corresponding to the PDCP entity configured for the terminal by the network device, the timeout time points of the PDCP discard timers of the respective PDCP SDUs in the PDCP SDU group are also consistent. In the case that the time starting points of the PDCP discard timers of the respective PDCP SDUs are consistent and the timeout time points thereof are also consistent, a PDCP discard timer corresponding to a PDCP SDU that arrives at the PDCP layer earlier starts timing first, and a PDCP discard timer corresponding to a PDCP SDU that arrives at the PDCP layer later starts timing later. Therefore, actual timing durations of the PDCP discard timers corresponding to the PDCP SDUs that arrive at the PDCP layer at different times are different.

Therefore, the timeout time points of the PDCP discard timers of the respective PDCP SDUs in the PDCP SDU group are the same, which avoids a situation that the PDCP discard timer of one PDCP SDU in the PDCP SDU group times out while other PDCP SDUs are still being transmitted; meanwhile, it is beneficial for prompting the terminal to complete the transmission of the PDCP SDUs before the unified timeout time points of the PDCP discard timers, and is beneficial for realizing the effective transmission of the PDCP SDUs and improving the air interface resource efficiency while ensuring the PDB.

Figure 4:
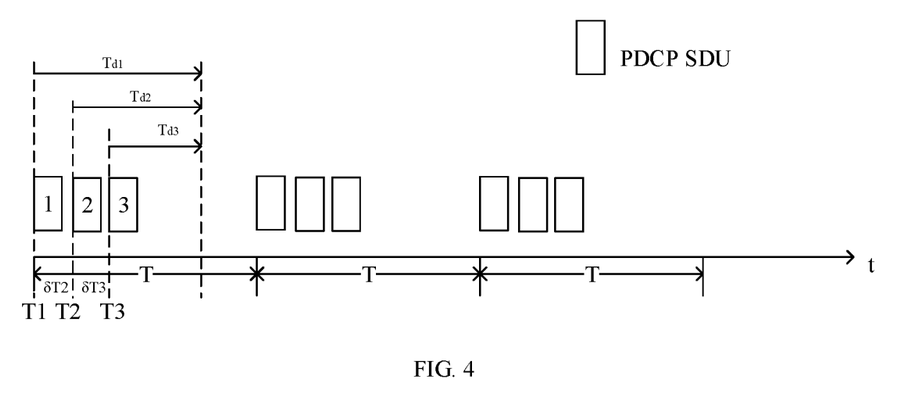
FIG. 4 is an example diagram of transmission of multiple IP packets in one data frame.

As an example, referring to FIG. 4, FIG. 4 is an example diagram of transmission of multiple IP packets in one data frame. As shown in FIG. 4, one data frame is divided into three IP packets, which are mapped to the first, second and third PDCP SDU respectively, and these three PDCP SDUs are called PDCP SDU1, PDCP SDU2 and PDCP SDU3 respectively. The arrival time of PDCP SDU1 (that is, the time when arriving at the PDCP layer) is T1, the arrival time of PDCP SDU2 is T1+δT2, and the arrival time of PDCP SDU3 is T1+δT3. Timeout time points of PDCP timers of the three PDCP SDUs are all T1+Td1, where Td1 represents the PDCP discard timer length of PDCP SDU1.

In Manner 1, in the PDCP SDU group, the arrival time of the first PDCP SDU is 0, and the time starting points of the PDCP discard timers of the PDCP SDUs that arrive subsequently are 0. Thus, when a PDCP SDU arrives at the PDCP layer, an initial value of starting timing by the PDCP discard timer of this PDCP SDU is a difference between the arrival time of this PDCP SDU and the arrival time of the first PDCP SDU, rather than starting timing from 0. For example, referring to FIG. 4, time starting points of the PDCP discard timer of PDCP SDU1, the PDCP discard timer of PDCP SDU2 and the PDCP discard timer of PDCP SDU3 all start from 0, so an initial value of the PDCP discard timer of PDCP SDU1 is 0, an initial value of starting timing by the PDCP discard timer of PDCP SDU2 when PDCP SDU2 arrives at the PDCP layer is δT2, and an initial value of starting timing by the PDCP discard timer of PDCP SDU3 when PDCP SDU3 arrives at the PDCP layer is δT3.

In some implementations, combining Manner 1 with the PDCP discard timer error threshold, the timeout time intervals of the PDCP discard timers of different PDCP SDUs in the PDCP SDU are less than the PDCP discard timer error threshold. Taking FIG. 4 as an example, a time interval between any two of the timeout time point of the PDCP discard timer of PDCP SDU1, the timeout time point of the PDCP discard timer of PDCP SDU2 and the timeout time point of the PDCP discard timer of PDCP SDU3 is less than the PDCP discard timer error threshold, which will not be described in detail here.

Manner 2: one PDCP discard timer corresponding to the PDCP entity is pre-configured for the terminal by the network device; in the PDCP SDU group, according to a difference between the time point when each PDCP SDU arrives at the PDCP layer and the time point when the first PDCP SDU arrives at the PDCP layer, the length of the PDCP discard timer configured by the network device is adjusted to obtain the length of the PDCP discard timer of the each PDCP SDU, where the time starting point of the PDCP discard timer of each PDCP SDU is the time point when the each PDCP SDU arrives at the PDCP layer.

In this embodiment, for multiple PDCP SDUs in the PDCP SDU group, the lengths of the PDCP discard timers of the remaining PDCP SDUs except the first PDCP SDU are adjusted to the difference between the arrival times of the PDCP SDUs and the arrival time of the first PDCP SDU. Therefore, based on the one PDCP discard timer pre-configured by the network device, even if the time starting points of the PDCP discard timers of the respective PDCP SDUs in the PDCP SDU group are different, the timeout time points of the PDCP discard timers of the respective PDCP SDUs in the PDCP SDU group are consistent by adjusting the lengths of the PDCP discard timers.

For example, in the PDCP SDU group, the time starting point (i.e., the initial value) of the PDCP discard timer of the first PDCP SDU is 0; the time starting points of the PDCP discard timers of the PDCP SDUs that arrive at the PDCP layer subsequently depend on the times when the PDCP SDUs arrive at the PDCP layer, but they all start timing from 0. For a PDCP SDU that arrives at the PDCP layer subsequently, the length of the PDCP discard timer of this PDCP SDU is set as the difference between the arrival time of this PDCP SDU and the arrival time of the first PDCP SDU. Referring to FIG. 4, the initial values of the PDCP discard timers of PDCP SDU1, PDCP SDU2 and PDCP SDU3 are all 0 (since the arrival times of PDCP SDU1, PDCP SDU2 and PDCP SDU3 are different, timing is started from different time points actually). The length of the PDCP discard timer of PDCP SDU1 is Td1, the length of the PDCP discard timer of PDCP SDU2 is Td1−δT2, and the length of the PDCP discard timer of PDCP SDU3 is Td1−δT3.

In some implementations, combining Manner 2 with the PDCP discard timer error threshold, the timeout time intervals of the PDCP discard timers of different PDCP SDUs in the PDCP SDU are less than the PDCP discard timer error threshold, which is not described in detail here.

Manner 3: multiple PDCP discard timers with different lengths corresponding to the PDCP entity are pre-configured for the terminal by the network device; in the PDCP SDU group, multiple PDCP discard timers is used in turn according to a sequence in which the PDCP SDUs arrive at the PDCP layer.

In this embodiment, the network device sets multiple PDCP discard timers for the PDCP entity for the terminal, and the lengths of the multiple PDCP discard timers are different. In the PDCP SDU group, according to a sequence of the PDCP SDUs arriving at the PDCP layer, the terminal determines a PDCP discard timer suitable for each PDCP SDU among the multiple PDCP discard timers in order of the length of the PDCP discard timer from large to small, so that the timeout time points of the PDCP discard timers of the respective PDCP SDUs in the PDCP SDU group are consistent or the timeout time intervals are less than the PDCP discard timer error threshold.

For example, the network device pre-configures a group of PDCP discard timers corresponding to the PDCP entity for the terminal: PDCP discard timer 1, PDCP discard timer 2 and PDCP discard timer 3, where the length of PDCP discard timer 1, the length of PDCP discard timer 2 and the length of PDCP discard timer 3 decrease in turn. Taking FIG. 4 as an example, the terminal can determine PDCP discard timer 1 to be the PDCP discard timer of PDCP SDU1, PDCP discard timer 2 to be the PDCP discard timer of PDCP SDU2, and PDCP discard timer 3 to be the PDCP discard timer of PDCP SDU3, so that the timeout times of the PDCP discard timers of the PDCP SDUs in the PDCP SDU group are similar.

Figure 5:
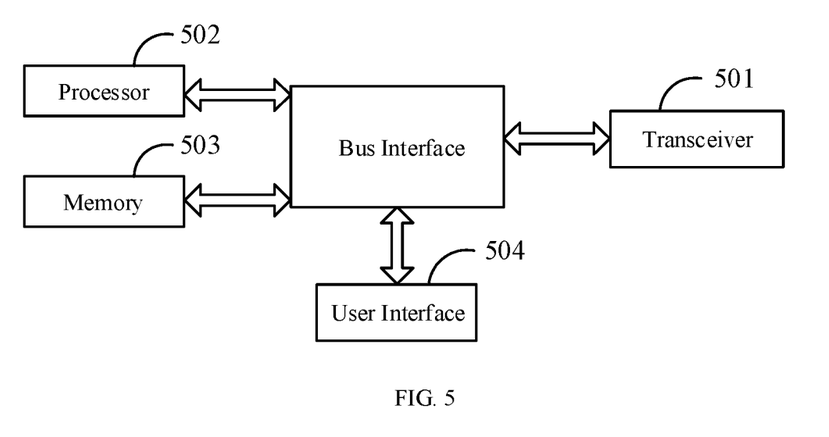
FIG. 5 is a schematic structural diagram of a timer processing apparatus provided by an embodiment of the present disclosure.

On a terminal side, an embodiment of the present disclosure provides a timer processing apparatus, and the timer processing apparatus in this embodiment may be a terminal. As shown in FIG. 5, the timer processing apparatus may include a transceiver 501, a processor 502 and a memory 503.

The transceiver 501 is adapted to receive and transmit data under control of the processor 502.

In FIG. 5, a bus architecture may include any number of interconnected buses and bridges, and specifically, various circuits of one or more processors represented by the processor 502 and a memory represented by the memory 503 are linked together. The bus architecture may also link various other circuits together, such as a peripheral device, a voltage regulator and a power management circuit, which are well known in the art and thus will not be further described here. A bus interface provides an interface. The transceiver 501 may be multiple elements, that is, including a transmitter and a receiver, providing units for communicating with various other apparatuses on transmission mediums. These transmission mediums include a wireless channel, a wired channel, an optical cable and other transmission mediums. In some optional implementations, the timer processing apparatus may also include a user interface 504. For different user equipments, the user interface 504 may also be an interface capable of externally/internally connecting a required device, and the connected device includes, but is not limited to, a keypad, a display, a speaker, a microphone, a joystick, etc.

The processor 502 is responsible for managing the bus architecture and general processing, and the memory 503 can store data used by the processor 502 when performing operations.

In some implementations, the processor 502 may be a central processing unit (CPU), an application specific integrated circuit (ASIC), a field-programmable gate array or a complex programmable logic device (CPLD), and the processor 502 may also adopt a multi-core architecture.

The processor 502 is adapted to execute any of the methods related to the terminal provided by the embodiments of the present disclosure according to the obtained executable instructions by calling a computer program stored in the memory 503. The processor and the memory may also be physically separated.

Specifically, the processor 502 is adapted to execute the following operation: determining a packet data convergence protocol (PDCP) service data unit (SDU) group, where the terminal maintains different PDCP discard timer lengths for multiple PDCP SDUs in the PDCP SDU group.

In some implementations, multiple PDCP SDUs in the PDCP SDU group are used for transmitting multiple IP packets of a same data frame.

In some implementations, PDCP discard timers of different PDCP SDUs in the PDCP SDU group have a same timeout time point, or timeout time intervals of PDCP discard timers of different PDCP SDUs are less than or equal to a PDCP discard timer error threshold.

In some implementations, the processor 502 further executes at least one of the following operations:
- in a case that a service to which the data frame belongs is a periodic service and there is only one data frame in one service cycle, determining the PDCP SDU group to include all PDCP SDUs within a same service cycle;
- in a case that IP packets carry data frame labels, determining the PDCP SDU group to include multiple PDCP SDUs for transmitting IP packets carrying same data frame labels;
- determining the PDCP SDU group to include PDCP SDUs for transmitting multiple IP packets of a same data frame, by performing deep packet parsing on the IP packets transmitted by the PDCP SDUS;
- in a case that PDCP SDUs carry group identifiers, determining the PDCP SDU group to include multiple PDCP SDUs with same group identifiers, where the group identifiers in the PDCP SDUs come from service data adaptation protocol (SDAP) protocol data units (PDUs).

In some implementations, at least two PDCP SDUs in the PDCP SDU group arrive at a PDCP layer at different time points, and the terminal maintains different PDCP discard timer lengths for multiple PDCP SDUs in the PDCP SDU group, including any one of the following:
- one PDCP discard timer corresponding to a PDCP entity is pre-configured for the terminal by a network device; in the PDCP SDU group, time starting points of PDCP discard timers of all PDCP SDUs are a time point when a first PDCP SDU arrives at the PDCP layer, and timeout time points of the PDCP discard timers of all PDCP SDUs are a timeout time point of a PDCP discard timer of the first PDCP SDU; or
- one PDCP discard timer corresponding to a PDCP entity is pre-configured for the terminal by a network device; in the PDCP SDU group, according to a difference between a time point when each PDCP SDU arrives at the PDCP layer and a time point when a first PDCP SDU arrives at the PDCP layer, a length of the PDCP discard timer configured by the network device is adjusted to obtain a length of a PDCP discard timer of the each PDCP SDU, where a time starting point of the PDCP discard timer of each PDCP SDU is the time point when the each PDCP SDU arrives at the PDCP layer; or
- multiple PDCP discard timers with different lengths corresponding to a PDCP entity are pre-configured for the terminal by a network device; in the PDCP SDU group, multiple PDCP discard timers is used in turn according to a sequence in which the PDCP SDUs arrive at the PDCP layer.

It should be noted here that the above apparatus provided by the present disclosure can implement all the method steps implemented by the terminal in the above method embodiments, and can achieve the same technical effects, so the parts in this embodiment that are same as those in the method embodiments and the beneficial effects will not be detailed here.

Figure 6:
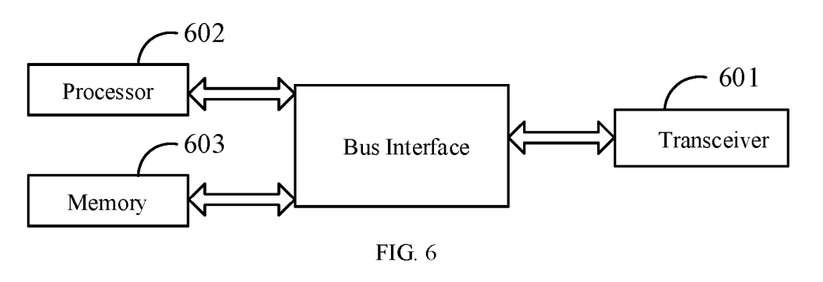
FIG. 6 is a schematic structural diagram of a timer processing apparatus provided by another embodiment of the present disclosure.

On a network side, an embodiment of the present disclosure provides a timer processing apparatus, and the timer processing apparatus of this embodiment may be a network device. As shown in FIG. 6, the timer processing apparatus includes a transceiver 601, a processor 602 and a memory 603.

The transceiver 601 is adapted to receive and transmit data under control of the processor 602.

In FIG. 6, a bus architecture may include any number of interconnected buses and bridges, and specifically, various circuits of one or more processors represented by the processor 602 and a memory represented by memory 603 are linked together. The bus architecture may also link various other circuits together, such as a peripheral device, a voltage regulator and a power management circuit, which are well known in the art and thus will not be further described here. A bus interface provides an interface. The transceiver 601 may be multiple elements, that is, including a transmitter and a receiver, providing units for communicating with various other devices on transmission mediums. These transmission mediums include a wireless channel, a wired channel, an optical cable and other transmission mediums. The processor 602 is responsible for managing the bus architecture and general processing, and the memory 603 can store data used by the processor 602 when performing operations.

The processor 602 may be a CPU, an ASIC, a FPGA or a CPLD, and the processor may also adopt a multi-core architecture.

The processor 602 is adapted to execute any of the methods related to the network device provided by the embodiments of the present disclosure according to the obtained executable instructions by calling a computer program stored in the memory 503. The processor and the memory may also be physically separated.

Specifically, the processor 602 is adapted to execute the following operations: configuring one or more PDCP discard timers corresponding to a PDCP entity for a terminal, and/or configuring a PDCP discard timer error threshold corresponding to the PDCP entity for the terminal, where the PDCP discard timer error threshold is used for constraining timeout time intervals of PDCP discard timers of different PDCP SDUs in a PDCP SDU group of the PDCP entity.

It should be noted here that the above apparatus provided by the present disclosure can implement all the method steps implemented by the network device in the above method embodiments, and can achieve the same technical effects, so the parts in this embodiment that are same as those in the method embodiments and the beneficial effects will not be detailed here.

Figure 7:
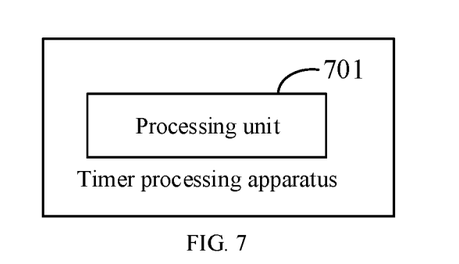
FIG. 7 is a schematic structural diagram of a timer processing apparatus provided by another embodiment of the present disclosure.

On a terminal side, an embodiment of the present disclosure further provides a timer processing apparatus, and the timer processing apparatus of this embodiment may be a terminal. As shown in FIG. 7, the timer processing apparatus includes a processing unit 701.

The processing unit 701 is adapted to determine a packet data convergence protocol (PDCP) service data unit (SDU) group, where the terminal maintains different PDCP discard timer lengths for multiple PDCP SDUs in the PDCP SDU group.

In some implementations, multiple PDCP SDUs in the PDCP SDU group are used for transmitting multiple IP packets of a same data frame.

In some implementations, PDCP discard timers of different PDCP SDUs in the PDCP SDU group have a same timeout time point, or timeout time intervals of PDCP discard timers of different PDCP SDUs are less than or equal to a PDCP discard timer error threshold.

In some implementations, the processing unit 701 is further adapted to perform at least one of the following operations:

in a case that a service to which the data frame belongs is a periodic service and there is only one data frame in one service cycle, determining the PDCP SDU group to include all PDCP SDUs within a same service cycle;

in a case that IP packets carry data frame labels, determining the PDCP SDU group to include multiple PDCP SDUs for transmitting IP packets carrying same data frame labels;

determining the PDCP SDU group to include PDCP SDUs for transmitting multiple IP packets of a same data frame, by performing deep packet parsing on the IP packets transmitted by the PDCP SDUs;

in a case that PDCP SDUs carry group identifiers, determining the PDCP SDU group to include multiple PDCP SDUs with same group identifiers, where the group identifiers in the PDCP SDUs come from service data adaptation protocol (SDAP) protocol data units (PDUs).

In some implementations, at least two PDCP SDUs in the PDCP SDU group arrive at a PDCP layer at different time points, and the terminal maintains different PDCP discard timer lengths for multiple PDCP SDUs in the PDCP SDU group, including any one of the following:

one PDCP discard timer corresponding to a PDCP entity is pre-configured for the terminal by a network device; in the PDCP SDU group, time starting points of PDCP discard timers of all PDCP SDUs are a time point when a first PDCP SDU arrives at the PDCP layer, and timeout time points of the PDCP discard timers of all PDCP SDUs are a timeout time point of a PDCP discard timer of the first PDCP SDU; or  one PDCP discard timer corresponding to a PDCP entity is pre-configured for the terminal by a network device; in the PDCP SDU group, according to a difference between a time point when each PDCP SDU arrives at the PDCP layer and a time point when a first PDCP SDU arrives at the PDCP layer, a length of the PDCP discard timer configured by the network device is adjusted to obtain a length of a PDCP discard timer of the each PDCP SDU, where a time starting point of the PDCP discard timer of each PDCP SDU is the time point when the each PDCP SDU arrives at the PDCP layer; or  multiple PDCP discard timers with different lengths corresponding to a PDCP entity are pre-configured for the terminal by a network device; in the PDCP SDU group, multiple PDCP discard timers is used in turn according to a sequence in which the PDCP SDUs arrive at the PDCP layer.

It should be noted here that the apparatus provided by the present disclosure can implement all the method steps implemented by the terminal in the above method embodiments, and can achieve the same technical effects, so the parts in this embodiment that are same as those in the method embodiments and the beneficial effects will not be detailed here.

Figure 8:
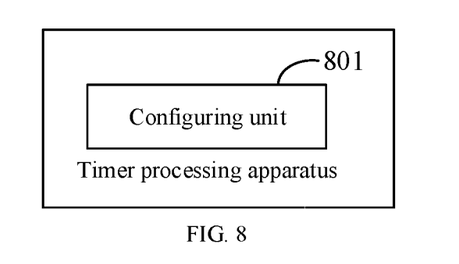
FIG. 8 is a schematic structural diagram of a timer processing apparatus provided by another embodiment of the present disclosure.

On a network side, an embodiment of the present disclosure further provides a timer processing apparatus, and the timer processing apparatus of this embodiment may be a network device. As shown in FIG. 8, the timer processing apparatus includes a configuring unit 801.

The configuring unit 801 is adapted to configure one or more PDCP discard timers corresponding to a PDCP entity for a terminal, and/or configuring a PDCP discard timer error threshold corresponding to the PDCP entity for the terminal, where the PDCP discard timer error threshold is used for constraining timeout time intervals of PDCP discard timers of different PDCP SDUs in a PDCP SDU group of the PDCP entity.

It should be noted here that the apparatus provided by the present disclosure can implement all the method steps implemented by the network device in the above method embodiments, and can achieve the same technical effects, so the parts in this embodiment that are same as those in the method embodiments and the beneficial effects will not be detailed here.

It should be noted that the division of units in the embodiments of the present disclosure is schematic and is only a logical function division, and there may be another division manners in actual implementations. In addition, the functional units in the embodiments of the present disclosure may be integrated into one processing unit, or each unit may exist physically alone, or two or more units may be integrated into one unit. The above integrated unit may be realized in the form of hardware, and may also be realized in the form of software functional units.

The integrated unit can be stored in a processor-readable storage medium if the integrated unit is implemented in the form of software functional units and is sold or used as an independent product. Based on this understanding, the technical solution of the present disclosure in essence or the part that contributes to the prior art or all or part of the technical solution can be embodied in the form of a software product. The computer software product is stored in a storage medium and includes several instructions to cause a computer device (which may be a personal computer, a server, a network device, etc.) or a processor to execute all or part of the steps of the methods described in various embodiments of the present disclosure. The aforementioned storage medium includes: a U disk, a mobile hard disk, a read-only memory (ROM), a random access memory (RAM), a magnetic disk, an optical disk or other mediums that can store program codes.

On a terminal side, an embodiment of the present disclosure provides a processor-readable storage medium, and the processor-readable storage medium stores a computer program. The computer program is used for causing a processor to execute any method related to the terminal provided by the embodiments of the present disclosure, so that the processor can implement all the method steps implemented by the terminal in the above method embodiments, and can achieve the same technical effects. The parts in this embodiment that are same as those in the method embodiments and the beneficial effects will not be detailed here.

On a network side, an embodiment of the present disclosure provides a processor-readable storage medium, and the processor-readable storage medium stores a computer program. The computer program is used for causing a processor to execute any of the methods related to the network device provided by the embodiments of the present disclosure, so that the processor can implement all the method steps implemented by the network device in the above method embodiments, and can achieve the same technical effects. The parts in this embodiment that are same as those in the method embodiments and the beneficial effects will not be detailed here.

The processor-readable storage medium may be any available medium or data storage device that the processor can access, including but not limited to magnetic memories (such as a floppy disk, a hard disk, a magnetic tape, a magneto-optical disk (MO), etc.), optical memories (such as a CD, a DVD, a BD, an HVD, etc.), and semiconductor memories (such as a ROM, an EPROM, an EEPROM, a non-volatile memory (NAND FLASH), a solid state disk (SSD)), etc.

It should be understood by those skilled in the art that the embodiments of the present disclosure may be provided as a method, a system or a computer program product. Therefore, the present disclosure may take the form of an entire-hardware embodiment, an entire-software embodiment, or an embodiment combining software and hardware aspects. Moreover, the present disclosure may take the form of a computer program product implemented on one or more computer usable storage mediums (including but not limited to a magnetic disk storage and an optical storage, etc.) containing computer usable program codes therein.

The present disclosure is described with reference to flowcharts and/or block diagrams of the methods, the apparatuses and the computer program products according to the embodiments of the present disclosure. It should be understood that each flow and/or block in the flowcharts and/or block diagrams and a combination of the flows and/or blocks in the flowcharts and/or block diagrams can be implemented by computer executable instructions. These computer executable instructions may be provided to a processor of a general-purpose computer, a special-purpose computer, an embedded processor or other programmable data processing devices to produce a machine, so that the instructions executed by the processor of the computer or other programmable data processing devices produce an apparatus for implementing the functions specified in one or more flows in the flowcharts and/or in one or more blocks in the block diagrams.

These processor executable instructions may also be stored in a processor-readable memory that can guide a computer or other programmable data processing devices to work in a particular manner, so that the instructions stored in the processor-readable memory produce a manufacture including an instruction apparatus, where the instruction apparatus implements the functions specified in one or more flows in the flowcharts and/or in one or more blocks in the block diagrams.

These processor executable instructions may also be loaded onto a computer or other programmable data processing devices, so that a series of operational steps are performed on the computer or other programmable devices to produce processing implemented by the computer, and thus the instructions executed on the computer or other programmable devices provide steps for implementing the functions specified in one or more flows in the flowcharts and/or in one or more blocks in the block diagrams.

Obviously, those skilled in the art can make various modifications and variations to the present disclosure without departing from the spirit and scope of the present disclosure. Thus, if these modifications and variations of the present disclosure belong to the scope of the claims of the present disclosure and their equivalent technique, the present disclosure is also intended to include these modifications and variations.

The invention claimed is:

1. A timer processing method, wherein the method is applied to a terminal, and comprises:
   determining a packet data convergence protocol (PDCP) service data unit (SDU) group, wherein the terminal maintains different PDCP discard timer lengths for multiple PDCP SDUs in the PDCP SDU group.

2. The timer processing method according to claim 1, wherein multiple PDCP SDUs in the PDCP SDU group are used for transmitting multiple IP packets of a same data frame.

3. The timer processing method according to claim 1, wherein PDCP discard timers of different PDCP SDUs in the PDCP SDU group have a same timeout time point, or timeout time intervals of PDCP discard timers of different PDCP SDUs are less than or equal to a PDCP discard timer error threshold.

4. The timer processing method according to claim 2, wherein determining the PDCP SDU group comprises at least one of the following:
   in a case that a service to which the data frame belongs is a periodic service and there is only one data frame in one service cycle, determining the PDCP SDU group to comprise all PDCP SDUs within a same service cycle;
   in a case that IP packets carry data frame labels, determining the PDCP SDU group to comprise multiple PDCP SDUs for transmitting IP packets carrying same data frame labels;
   determining the PDCP SDU group to comprise PDCP SDUs for transmitting multiple IP packets of a same data frame, by performing deep packet parsing on the IP packets transmitted by the PDCP SDUs;
   in a case that PDCP SDUs carry group identifiers, determining the PDCP SDU group to comprise multiple PDCP SDUs with same group identifiers, wherein the group identifiers in the PDCP SDUs come from service data adaptation protocol (SDAP) protocol data unit (PDUs).

5. The timer processing method according to claim 1, wherein at least two PDCP SDUs in the PDCP SDU group arrive at a PDCP layer at different time points, and the terminal maintains different PDCP discard timer lengths for multiple PDCP SDUs in the PDCP SDU group, comprising any one of the following:
   one PDCP discard timer corresponding to a PDCP entity is pre-configured for the terminal by a network device; in the PDCP SDU group, time starting points of PDCP discard timers of all PDCP SDUs are a time point when a first PDCP SDU arrives at the PDCP layer, and timeout time points of the PDCP discard timers of all PDCP SDUs are a timeout time point of a PDCP discard timer of the first PDCP SDU; or
   one PDCP discard timer corresponding to a PDCP entity is pre-configured for the terminal by a network device; in the PDCP SDU group, according to a difference between a time point when each PDCP SDU arrives at the PDCP layer and a time point when a first PDCP SDU arrives at the PDCP layer, a length of the PDCP discard timer configured by the network device is adjusted to obtain a length of a PDCP discard timer of the each PDCP SDU, wherein a time starting point of the PDCP discard timer of each PDCP SDU is the time point when the each PDCP SDU arrives at the PDCP layer; or
   multiple PDCP discard timers with different lengths corresponding to a PDCP entity are pre-configured for the terminal by a network device; in the PDCP SDU group, multiple PDCP discard timers is used in turn according to a sequence in which the PDCP SDUs arrive at the PDCP layer.

6. A timer processing method, wherein the method is applied to a network device, and comprises:
   configuring one or more PDCP discard timers corresponding to a PDCP entity for a terminal, and/or configuring a PDCP discard timer error threshold corresponding to the PDCP entity for the terminal, wherein the PDCP discard timer error threshold is used for constraining timeout time intervals of PDCP discard timers of different PDCP SDUs in a PDCP SDU group of the PDCP entity.

7. A timer processing apparatus, applied to a terminal, wherein the timer processing apparatus comprises a memory, a transceiver and a processor;
the memory is adapted to store a computer program;
the transceiver is adapted to receive and transmit data under control of the processor;
the processor is adapted to read the computer program in the memory and perform the following operation:
determining a packet data convergence protocol (PDCP) service data unit (SDU) group, wherein the terminal maintains different PDCP discard timer lengths for multiple PDCP SDUs in the PDCP SDU group.

8. The timer processing apparatus according to claim 7, wherein multiple PDCP SDUs in the PDCP SDU group are used for transmitting multiple IP packets of a same data frame.

9. The timer processing apparatus according to claim 7, wherein PDCP discard timers of different PDCP SDUs in the PDCP SDU group have a same timeout time point, or timeout time intervals of PDCP discard timers of different PDCP SDUs are less than or equal to a PDCP discard timer error threshold.

10. The timer processing apparatus according to claim 8, wherein the processor is further adapted to perform at least one of the following operations:
in a case that a service to which the data frame belongs is a periodic service and there is only one data frame in one service cycle, determining the PDCP SDU group to comprise all PDCP SDUs within a same service cycle;
in a case that IP packets carry data frame labels, determining the PDCP SDU group to comprise multiple PDCP SDUs for transmitting IP packets carrying same data frame labels;
determining the PDCP SDU group to comprise PDCP SDUs for transmitting multiple IP packets of a same data frame, by performing deep packet parsing on the IP packets transmitted by the PDCP SDUs;
in a case that PDCP SDUs carry group identifiers, determining the PDCP SDU group to comprise multiple PDCP SDUs with same group identifiers, wherein the group identifiers in the PDCP SDUs come from service data adaptation protocol (SDAP) protocol data units (PDUs).

11. The timer processing apparatus according to claim 7, wherein at least two PDCP SDUs in the PDCP SDU group arrive at a PDCP layer at different time points, and the terminal maintains different PDCP discard timer lengths for multiple PDCP SDUs in the PDCP SDU group, comprising any one of the following:
one PDCP discard timer corresponding to a PDCP entity is pre-configured for the terminal by a network device; in the PDCP SDU group, time starting points of PDCP discard timers of all PDCP SDUs are a time point when a first PDCP SDU arrives at the PDCP layer, and timeout time points of PDCP discard timers of all PDCP SDUs are a timeout time point of a PDCP discard timer of the first PDCP SDU; or
one PDCP discard timer corresponding to a PDCP entity is pre-configured for the terminal by a network device; in the PDCP SDU group, according to a difference between a time point when each PDCP SDU arrives at the PDCP layer and a time point when a first PDCP SDU arrives at the PDCP layer, a length of the PDCP discard timer configured by the network device is adjusted to obtain a length of a PDCP discard timer of the each PDCP SDU, wherein a time starting point of the PDCP discard timer of each PDCP SDU is the time point when the each PDCP SDU arrives at the PDCP layer; or
multiple PDCP discard timers with different lengths corresponding to a PDCP entity are pre-configured for the terminal by a network device; in the PDCP SDU group, multiple PDCP discard timers is used in turn according to a sequence in which the PDCP SDUs arrive at the PDCP layer.

12. A timer processing apparatus, applied to a network device, wherein the timer processing apparatus comprises a memory, a transceiver and a processor;
the memory is adapted to store a computer program;
the transceiver is adapted to receive and transmit data under control of the processor;
the processor is adapted to read the computer program in the memory and perform the timer processing method according to claim 6.

13. A non-transitory processor-readable storage medium, wherein the non-transitory processor-readable storage medium stores a computer program for causing a processor to execute the timer processing method according to claim 1.

14. The non-transitory processor-readable storage medium according to claim 13, wherein multiple PDCP SDUs in the PDCP SDU group are used for transmitting multiple IP packets of a same data frame.

15. The non-transitory processor-readable storage medium according to claim 13, wherein PDCP discard timers of different PDCP SDUs in the PDCP SDU group have a same timeout time point, or timeout time intervals of PDCP discard timers of different PDCP SDUs are less than or equal to a PDCP discard timer error threshold.

16. The non-transitory processor-readable storage medium according to claim 14, wherein the non-transitory processor-readable storage medium stores the computer program for causing the processor further to perform at least one of the following operations:
in a case that a service to which the data frame belongs is a periodic service and there is only one data frame in one service cycle, determining the PDCP SDU group to comprise all PDCP SDUs within a same service cycle;
in a case that IP packets carry data frame labels, determining the PDCP SDU group to comprise multiple PDCP SDUs for transmitting IP packets carrying same data frame labels;
determining the PDCP SDU group to comprise PDCP SDUs for transmitting multiple IP packets of a same data frame, by performing deep packet parsing on the IP packets transmitted by the PDCP SDUs;
in a case that PDCP SDUs carry group identifiers, determining the PDCP SDU group to comprise multiple PDCP SDUs with same group identifiers, wherein the group identifiers in the PDCP SDUs come from service data adaptation protocol (SDAP) protocol data units (PDUs).

17. The non-transitory processor-readable storage medium according to claim 13, wherein at least two PDCP SDUs in the PDCP SDU group arrive at a PDCP layer at different time points, and the terminal maintains different PDCP discard timer lengths for multiple PDCP SDUs in the PDCP SDU group, comprising any one of the following:

one PDCP discard timer corresponding to a PDCP entity is pre-configured for the terminal by a network device; in the PDCP SDU group, time starting points of PDCP discard timers of all PDCP SDUs are a time point when a first PDCP SDU arrives at the PDCP layer, and timeout time points of PDCP discard timers of all PDCP SDUs are a timeout time point of a PDCP discard timer of the first PDCP SDU; or one PDCP discard timer corresponding to a PDCP entity is pre-configured for the terminal by a network device; in the PDCP SDU group, according to a difference between a time point when each PDCP SDU arrives at the PDCP layer and a time point when a first PDCP SDU arrives at the PDCP layer, a length of the PDCP discard timer configured by the network device is adjusted to obtain a length of a PDCP discard timer of the each PDCP SDU, wherein a time starting point of the PDCP discard timer of each PDCP SDU is the time point when the each PDCP SDU arrives at the PDCP layer; or multiple PDCP discard timers with different lengths corresponding to a PDCP entity are pre-configured for the terminal by a network device; in the PDCP SDU group, multiple PDCP discard timers is used in turn according to a sequence in which the PDCP SDUs arrive at the PDCP layer.

18. A non-transitory processor-readable storage medium, wherein the non-transitory processor-readable storage medium stores a computer program for causing a processor to execute the timer processing method according to claim 6.

19. The timer processing method according to claim 6, wherein for each PDCP entity, the network device configures one or more PDCP discard timers and/or the PDCP discard timer error threshold corresponding to the PDCP entity for the terminal by sending a configuration message to the terminal in advance.

20. The timer processing method according to claim 2, wherein at least two PDCP SDUs in the PDCP SDU group arrive at a PDCP layer at different time points, and the terminal maintains different PDCP discard timer lengths for multiple PDCP SDUs in the PDCP SDU group, comprising any one of the following:

one PDCP discard timer corresponding to a PDCP entity is pre-configured for the terminal by a network device; in the PDCP SDU group, time starting points of PDCP discard timers of all PDCP SDUs are a time point when a first PDCP SDU arrives at the PDCP layer, and timeout time points of the PDCP discard timers of all PDCP SDUs are a timeout time point of a PDCP discard timer of the first PDCP SDU; or one PDCP discard timer corresponding to a PDCP entity is pre-configured for the terminal by a network device; in the PDCP SDU group, according to a difference between a time point when each PDCP SDU arrives at the PDCP layer and a time point when a first PDCP SDU arrives at the PDCP layer, a length of the PDCP discard timer configured by the network device is adjusted to obtain a length of a PDCP discard timer of the each PDCP SDU, wherein a time starting point of the PDCP discard timer of each PDCP SDU is the time point when the each PDCP SDU arrives at the PDCP layer; or multiple PDCP discard timers with different lengths corresponding to a PDCP entity are pre-configured for the terminal by a network device; in the PDCP SDU group, multiple PDCP discard timers is used in turn according to a sequence in which the PDCP SDUs arrive at the PDCP layer.

* * * * *